United States Patent Office 3,230,863
Patented Jan. 25, 1966

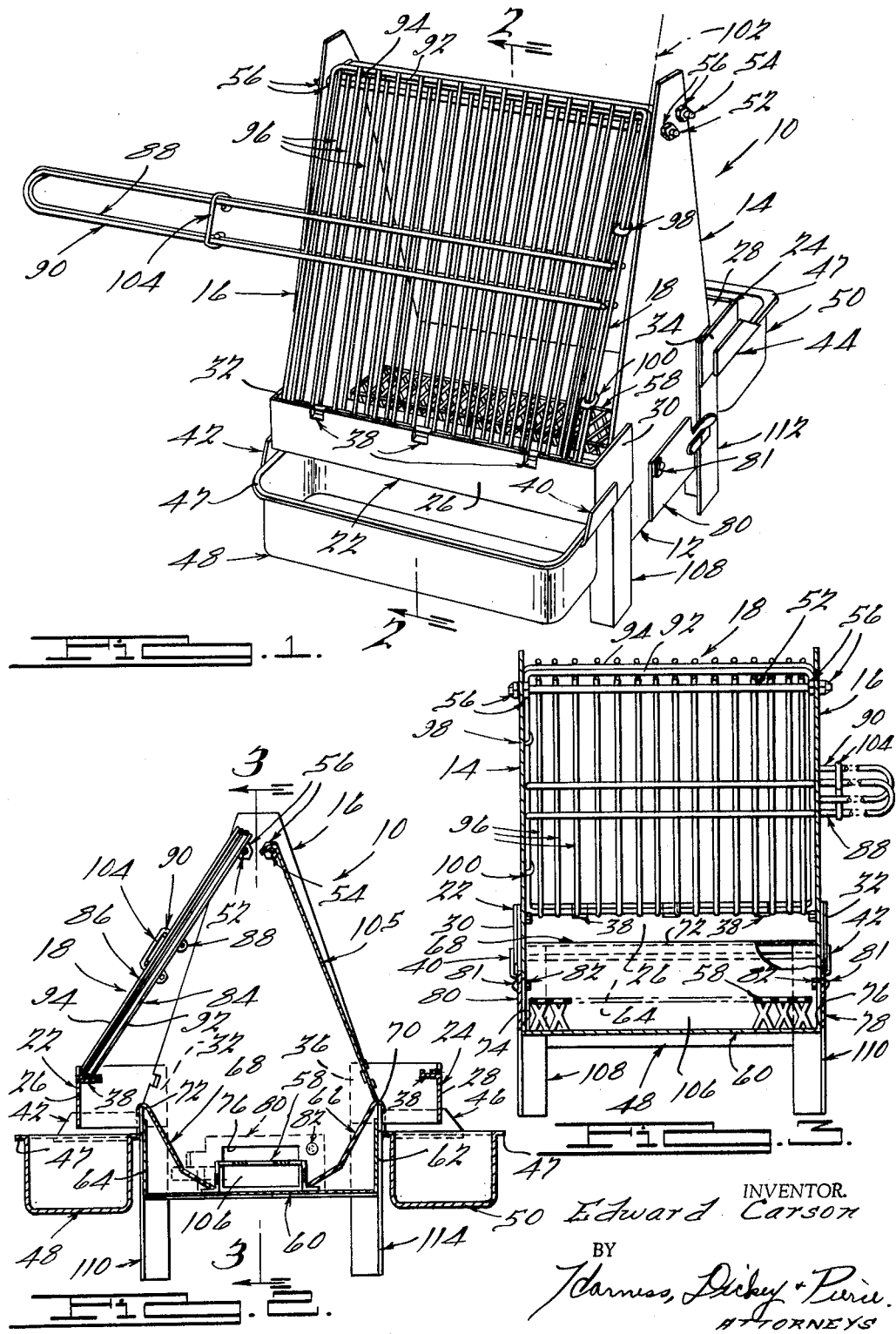

3,230,863
DOUBLE-FACED CHARCOAL BROILER
Edward Carson, 154 N. Berkshire Road,
Pontiac, Mich.
Filed Sept. 6, 1963, Ser. No. 307,101
5 Claims. (Cl. 99—400)

This invention relates generally to cooking apparatus, and more particularly, to a portable charcoal broiler having a pair of substantially vertical disposed grills supported adjacent a central charcoal heating element.

The use of portable electric table broilers, rotisseries and the like, for indoor cooking is of course well known in the art. Similarly, broilers using charcoal or related combustible fuels as heating elements are well known, even though culinary efforts on such equipment have been generally restricted to the outdoors due to the smoke and odoriferous emissions of such fuels. It has heretofore been desired to employ such charcoal broilers inside when climatic conditions so dictate, but the heretofore known and used assemblages have been frequently too bulky or susceptible to being easily upset and thereby creating dangerous fire hazards for such in door use. Another objectionable feature heretofore prevalent in such assemblages is that the bed of combusting charcoal is employed directly subjacent the material being broiled, thus causing the melting fat or food particles excreting therefrom to drip directly onto the combusting charcoal during the cooking operation. This has been objectionable since it adversely affected the uniformity of the heat emitted, thus resulting in non-uniform cooking and excessive discharges of vaporous and odoriferous substances, frequently causing the combusting charcoal to flare up and sear the material being cooked.

It has been proposed to provide a vertically extending firebox adjacent such cooking material to alleviate the latter of these objections; however, such arrangements have only partially overcome the aforementioned objections and have been found to be substantially undesirable due to the large quantities of charcoal required, and which charcoal when disposed in such a vertical configuration has been found to be inherently incapable of concomitant combustion.

Accordingly, the present invention is adapted to overcome these aforediscussed objectionable features of the charcoal broilers heretofore known and used by providing a novel charcoal broiler employing a horizontally disposed bed of charcoal interjacent a pair of substantially vertically mounted food supporting grills. With such a construction, substantially uniform combustion of the charcoal is provided thereby effectuating uniform heating of the material being cooked, and also obviating the possibility of melted fat and food particles falling from the materials being cooked into the combusting charcoal and resulting in searing or otherwise damaging the adjacent surfaces thereof. Furthermore, the charcoal broiler of the present invention is of a substantially compact construction and is adapted to be fabricated of relatively light-weight materials thereby facilitating convenient operation both out of doors or within a conventional household fireplace, thus precluding any climatic restrictions of the use thereof.

It is therefore a primary object of the present invention to provide an improved charcoal broiler of a compact light-weight and easily transportable construction.

It is another object of the present invention to provide an improved charcoal broiler of the above character wherein the charcoal heating elements is disposed interjacent a pair of substantially vertically mounted food supporting grills.

It is another object of the present invention to provide an improved charcoal broiler of the above character wherein only a very small quantity of charcoal fuel is required to provide ample heat for cooking.

It is still another object of the present invention to provide an improved charcoal broiler of the above character wherein the grease excretions of the food being cooked do not drip on the heating element thereby precluding searing or otherwise damaging the surfaces thereof.

It is still another object of the present invention to provide an improved charcoal broiler of the above character incorporating a pair of removable grease depositories.

It is yet another object of the present invention to provide an improved charcoal broiler of a simple design that can be easily assembled and economically manufactured.

Other objects and advantages of the present invention will become apparent from the following detailed description taken in conjunction with the accompanying drawings wherein:

FIGURE 1 is an elevated perspective view of an exemplary embodiment of the charcoal broiler of the present invention;

FIGURE 2 is a cross-sectional view taken substantially along the line 2—2 of FIGURE 1; and FIGURE 3 is a cross-sectional view of the structure illustrated in FIGURE 2, taken substantially along the line 3—3 thereof.

Referring now to the drawings, a charcoal broiler 10, in accordance with a preferred embodiment of the present invention, comprises a generally rectangular configured firebox 12 having a pair of upwardly converging end walls 14 and 16. The charcoal broiler 10 is adapted to operatively maintain a pair of food supporting grills, one of which is illustrated and designated by the numeral 18, adjacent a bed of combusting charcoal (not shown), and effectuate a cooking of the food supported therewithin, in a manner hereinafter to be specifically described.

As best seen in FIGURE 2, a pair of generally C-shaped support members 22 and 24, having longitudinally extending central portions 26 and 28 with respective end portions 30, 32 and 34, 36 extending perpendicularly therefrom, are secured as by spot welding, riveting or the like, to each of the longitudinal sides of the firebox 12. A plurality of inwardly extending flanges, generally designated 38, are formed on the central portion 26 of the support member 22 for the operative support of the lower edge of the grill 18.

A plurality of slide brackets 40, 42, 44 and 46 are respectively secured, as by spot welding, to the lower edges of the end portions 30, 32, 34 and 36 of the support members 22 and 24, and each is adapted to slidably engage an outer rim portion 47 formed on the periphery of a pair of grease depository pans 48 and 50. Accordingly, the grease depository pan 48, together with its associated pan 50, may be slidably biased from a position underlying the grill 18 thereby enabling the convenient cleaning thereof.

A pair of longitudinally extending cylindrical rods 52 and 54 extend between the upper end portions of the end walls 14 and 16 and are threadably secured thereto as by a plurality of nuts, generally designated by the numeral 56. The rod 54 is adapted to operatively support the upper end portion of the grill 18 such that the material to be cooked which is supported therewithin is operatively disposed adjacent the combusting charcoal within the firebox 12, as will be described.

Referring now to FIGURES 2 and 3, a longitudinally extending grate 58, constructed of conventional heavy gage expanded metal, is interposed between the end walls 14 and 16 of the firebox 12 adjacent a bottom panel, generally designated 60, thereof. Disposed interjacent the grate 58 and the longitudinally extending side portions of the firebox 12, hereinafter designated 62 and 64 is a pair of angularly configured elongated lining members 66 and 68. The lining members 66 and 68 are respectively provided with arcuately configured upper end portions 70 and 72 adapted to respectively surmount the upper edges of the side portions 62 and 64 of the firebox 12 thereby supporting the lining members 62 and 64 of the firebox thereby supporting the lining members 66 and 68 in the configuration illustrated in FIGURE 2.

It will be seen in FIGURE 2 that the lining members 66 and 68 converge towards the grate 58 on the bottom panel 60 of the firebox 12 thereby positioning a charcoal heating element substantially midway between the side portions 62 and 64 thereof. With such a construction, the charcoal is concentrated in one central aggregation, and is precluded from lying directly adjacent the side portions 62 and 64 by the lining members 66 and 68, whereby upon the ignition thereof, substantially concomitant combustion of the entire heating element occurs. Accordingly, it has been found that with such a construction, only a very small quantity of charcoal is required to provide sufficient heat for the entire cooking operation, and upon the completion thereof, there will be substantially no partially combusted charcoal elements to delay the cleaning or transporting of the grill assembly.

Referring now to FIGURES 1 and 3, the end walls 14 and 16 of the firebox 12 are each provided with one of a pair of rectangularly configured apertures 74 and 76 respectively, adapted to permit the ingress and egress of air through the grate 58 thereby providing a suitable draft for the combusting charcoal adjacent thereto. A pair of closure doors 78 and 80 are pivotably secured to the end walls 14 and 16, as by machine screws 81 and nuts 82, to provide means for operatively restricting the air flowing to and from the grate 58 through the apertures 74 and 76.

As best seen in FIGURE 3, the grill 18 comprises a pair of substantially identical grill halves 84 and 86 respectively provided with elongated handles 88 and 90, which extend longitudinally outward from rectangularly configured frame protions 92 and 94. A plurality of substantially vertical extending cross members, generally designated by the numeral 96, affixed, as by welding, to each of the frame portions 92 and 94, which cross members 96 are adapted to direct the grease excrements from the material being cooked within the grill 18 into the grease depository pan 48. The grill halves 84 and 86 are pivotally connected by a pair of conventional pivot links 98 and 100 and are adapted to be operatively pivoted about their mutual hinge axis, generally designated 102, to facilitate insertion of the material to be cooked therebetween. A generally C-shaped clip 104 is slidably mounted on the handle 88 and is adapted to surmount the handle 90 such that when slidably disposed towards the grill halves 84 and 86, the material to be cooked is effectively secured therebetween. The grill handles 88 and 90, together with the frame portions 92 and 94, and the cross-members 96, may be constructed of any easily formed elongated cylindrical stock, for example, No. 12 extruded wire.

To facilitate correlating the various elements hereinbefore specifically disclosed, a brief résumé of the operation of the charcoal grill 10 is hereinafter described.

Initially, it should be noted that if only one side of the firebox 12 is to be used, for example, when only using the grill 18, a heat shield or reflector, representatively designated by the numeral 105, may be substituted for the other grill, which reflector 105 may be constructed out of any light weight material having beneficial heat and light reflective surface characteristics, such as stainless steel or the like. By placing the reflector 105 on the firebox 12 in the configuration illustrated in FIGURE 2, it has been found that the heat loss from the combusting charcoal is substantially reduced while the heat transfer characteristics from the charcoal to the material being cooked within the grill 18 are radically improved.

Upon removing the grill 18 from its operative position on the firebox 12, a supply of charcoal may be placed into the firebox 12 interjacent the lining members 62 and 64 thereof. It will be seen that the apertures 74 and 76, respectively formed in the sides 14 and 16 of the firebox 12, and which comprise the air drafts for the combusting charcoal therewithin, are aligned with a rectangularly shaped cavity 106 extending longitudinally within the grate 58. Accordingly, a conventional electric charcoal ignitor may be inserted through one of the apertures 74 and 76 and into the cavity 106 subjacent the charcoal within the firebox 12 thereby supplying sufficient heat to the charcoal to effect the ignition thereof. It will be noted also, that the apertures 74 and 76 are equally adapted to receive the head of a conventional blow torch for the aforementioned charcoal ignition operation.

Approximately 15 minutes after ignition, the charcoal will be uniformly burning so as to provide ample heat for the cooking operation, and during which interim, the grill 18 may be opened by pivoting the grill halves 84 and 86 along their hinge axis 102 to receive the material to be cooked. After the grill halves 84 and 86 have been pivoted into a substantially parallel relationship, the clip 104 is biased axially inward along the handles 88 and 90 thereof to secure the material to be cooked therewithin. The grill 18 is then positioned on the firebox 12 by placing the lower edge thereof upon the flanges 38 of the central portion 26 of the bracket 22, and the upper end portion thereof adjacent the rod 52 extending between the upper end portions of the end walls 14 and 16.

As the material within the grill 18 is being cooked, the melted fat and food particles excreting therefrom runs down the cross members 96 and into the grease pan 48, thereby obviating the possibility of such excrements striking the combusting charcoal and creating "grease flashes" which might tend to sear or otherwise damage the cooking material. Also, such excrements are precluded from being vaporized by the heat of the combusting charcoal in the event it is desired to use the grease excrements for basting the material being cooked.

When the material cooking within the grill 18 is sufficiently heated on the side thereof adjacent the firebox 12, the grill 18 is easily removed and rotated 180° thereby subjecting the uncooked portion to the heat of the combusting charcoal for the remainder of the cooking operation. Upon completion of such cooking operation, the grill 18 and the grease pan 48 may be readily removed from the firebox 12 for the convenient cleaning thereof.

It will be noted that while the lining members 66 and 68 preclude the combusting charcoal from lying adjacent the side portions 62 and 64 of the firebox 12, they are also adapted to substantially mitigate the transfer of heat from the combusting charcoal to the firebox side portions 62 and 64, and also the bottom panel 60 thereof. Accordingly, the firebox 12 may be placed on top of any appropriate table or counter without fear of damaging the surface thereof by excessive radiation of heat from the combusting charcoal therewithin.

It has been found that the maximum degree of heat is transferred between the combustion charcoal and the material being cooked within the grill 18 when such grill is disposed at an angle of approximately 30° from vertical. With such a configuration, the material being cooked is subjected to a substantial quantity of the heat emanating vertically upward from the charcoal while such support prevents the grease excrements thereof from falling directly on the charcoal.

The firebox 12, together with the brackets 22 and 24, and the lining members 62 and 64, may be fabricated from a suitable light-weight hot or cold-rolled steel, or if desired from stainless steel, thereby providing a charcoal grill of a substantially strong and rigid construction, while minimizing the structurally accrued weight thereof. Also, it will be noted that the charcoal broiler 10 of the present invention is of a generally compact construction thereby being adapted to be utilized within a conventional household fireplace at such times as climatic conditions discourage the use thereof outdoors. However, at such time as it is desired to enjoy its use outdoors, a plurality of extension legs (not shown) may be operatively secured to legs 108, 110, 112 and 114 extending downwardly from the firebox 12, thereby supporting the broiler 10 at a height at which it may be conveniently operated.

While it will be apparent that the preferred embodiment herein illustrated is well calculated to fulfill the objects stated, it will be appreciated that the invention is susceptible to modification, variation and change without departing from the proper scope or fair meaning of the subjoined claims.

What is claimed is:

1. In a broiler frame means, an upwardly facing central elongated fire box, a grate within said fire box and extending longitudinally thereof to provide a cavity between said fire box and said grate, said frame providing openings at the ends of said cavity for permitting the ingress and egress of air through said cavity, closure means on said frame for controlling ingress and egress of air through said openings, a pair of liners extending longitudinally of said fire box and converging downwardly toward each other and toward said grate, grill means including a plurality of spaced, elongated, generally parallel cross members supported by said frame means above said fire box with the cross members extending substantially from the top to the bottom end of said grill means, said grill means being disposed with a major upper portion of the cross members overlying the fire box and forming an acute angle with the vertical, an elongated grease depository pan removably carried by said frame means outwardly of said fire box and substantially directly below the bottom end of said grill means, and a bracket attached to said frame means and extending over said grease depository pan to engage and support said bottom end of said grill means, whereby optimum heat transfer is effected between the fire box and the grill and whereby the drippings are caused to run down the cross members and fall into the depository pan.

2. In a broiler frame means, an upwardly facing central elongated fire box, grill means including a plurality of spaced, elongated, generally parallel cross members supported by said frame means with the cross members extending substantially from the top to the bottom end of said grill means, said grill means being disposed with said top end thereof positioned substantially over the center of said fire box and forming an acute angle with the vertical, an elongated grease depository pan removably carried by said frame means outwardly of said fire box and substantially directly below the bottom end of said grill means, and a bracket attached to said frame means and extending over said grease depository pan to engage and support said bottom end of said grill means, whereby optimum heat transfer is effected between the fire box and the grill and whereby the drippings are caused to run down the cross members and fall into the depository pan.

3. In a broiler frame means, an upwardly facing central elongated fire box, grill means including a plurality of spaced elongated, generally parallel cross members supported by said frame means with the cross members extending substantially from the top to the bottom end of said grill means, said grill means being disposed with said top end thereof positioned substantially over the center of said fire box and forming an angle of about 30°, an elongated grease depository pan removably carried by said frame means outwardly of said fire box and substantially directly below the bottom end of said grill means and a bracket attached to said frame means and extending over said grease depository pan to engage and support said bottom end of said grill means, whereby optimum heat transfer is effected between the fire box and the grill and whereby the drippings are caused to run down the cross members and fall into the depository pan.

4. In a broiler frame means, an upwardly facing central elongated fire box, a pair of liners extending longitudinally of said fire box and converging downwardly toward each other and toward the center of said fire box, grill means including a plurality of spaced elongated, generally parallel cross members supported by said frame means with the cross members extending substantially from the top to the bottom end of said grill means, said grill means being disposed with said top end thereof positioned substantially over the center of said fire box and forming an acute angle with the vertical, an elongated grease depository pan removably carried by said frame means outwardly of said fire box and substantially directly below the bottom end of said grill means and a bracket attached to said frame means and extending over said grease depository pan to engage and support said bottom end of said grill means, whereby optimum heat transfer is effected between the fire box and the grill and whereby the drippings are caused to run down the cross members and fall into the depository pan.

5. In a broiler frame means, an upwardly facing central elongated fire box, an opposed pair of grill members, each including a plurality of spaced, elongated, generally parallel cross members supported by said frame means with the cross members extending substantially from the top to the bottom end of said grill members, said grill members being disposed with said top end thereof positioned substantially over the center of said fire box and together forming an angle of about 60°, a pair of elongated grease depository pans removably carried by said frame means outwardly of said fire box and one each substantially directly below the bottom end of a respective one of said grill members, and a pair of brackets attached to said frame means and one each extending over a respective one of said grease depository pans to engage and support said bottom end of said grill members, whereby optimum heat transfer is effected between the fire box and the grill and whereby the drippings are caused to run down the cross members and fall into the depository pan.

References Cited by the Examiner
UNITED STATES PATENTS

| 363,519 | 5/1887 | Houston | 99—402 |
| 2,760,427 | 8/1956 | Alberhasky | 126—25 X |
| 3,091,171 | 5/1963 | Cole | 126—25 |

FOREIGN PATENTS

| 22,418 | 2/1896 | Great Britain. |
| 36,950 | 7/1911 | Sweden. |

WALTER A. SCHEEL, *Primary Examiner.*

JEROME SCHNALL, ROBERT E. PULFREY,
*Examiners.*